US008423682B2

(12) United States Patent
Datta et al.

(10) Patent No.: US 8,423,682 B2
(45) Date of Patent: Apr. 16, 2013

(54) ADDRESS SPACE EMULATION

(75) Inventors: Sham M. Datta, Hillsboro, OR (US); Robert Greiner, Beaverton, OR (US); Frank Binns, Fordham (GB); Keshavan Tiruvallur, Tigard, OR (US); Rajesh Parthasarathy, Hillsboro, OR (US); Madhavan Parthasarathy, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 348 days.

(21) Appl. No.: 11/323,465

(22) Filed: Dec. 30, 2005

(65) Prior Publication Data
US 2007/0174587 A1 Jul. 26, 2007

(51) Int. Cl.
*G06F 3/00* (2006.01)
*G06F 12/00* (2006.01)
*G06F 9/26* (2006.01)
*G06F 9/34* (2006.01)

(52) U.S. Cl.
USPC ............... 710/8; 711/202; 711/212; 711/220

(58) Field of Classification Search ...... 710/8; 711/202, 711/212, 220
See application file for complete search history.

(56) References Cited

U.S. PATENT DOCUMENTS

| 5,638,532 | A * | 6/1997 | Frame et al. ............. 711/154 |
| 6,189,062 | B1 | 2/2001 | Jander et al. |
| 6,457,115 | B1 * | 9/2002 | McGrath .................. 711/220 |
| 6,629,157 | B1 | 9/2003 | Falardeau et al. |
| 6,725,366 | B1 * | 4/2004 | Swanberg ............... 712/233 |

FOREIGN PATENT DOCUMENTS

| EP | 0 530 682 | 3/1993 |
| GB | 2 290 640 | 1/1996 |
| JP | 08-44655 | 2/1996 |
| JP | 2004-531838 | 10/2004 |

OTHER PUBLICATIONS

"Lenore Zuck: Microcode Verification," Oct. 21, 2005, http://www.cs.cmu.edu/~svc/talks/20051031-zuck.html.*
"Chinese Application Serial No. 200610172301.8, Office Action mailed May 9, 2008", 16 pgs.
Office action from counterpart Japanese Patent Application No. 2006-349809, mailed Jan. 12, 2010, 4 pages (Translation included).
Office action from counterpart European Patent Application No. 06256614.6, Mailed Mar. 27, 2008, 8 Pages.
Issued Patent from counterpart Taiwan Patent Application No. 95146436, mailed Oct. 28, 2010, 8 pages.
Office Action and IPO Search Report from counterpart Taiwan Patent Application No. 95146436, mailed Mar. 24, 2010, 5 pages.

(Continued)

*Primary Examiner* — Chun-Kuan Lee
(74) *Attorney, Agent, or Firm* — Blakely, Sokoloff, Taylor & Zafman LLP

(57) ABSTRACT

Apparatus and systems, as well as methods and articles, may operate to detect an input/output access operation associated with a configuration memory address and a first memory address bit size. The configuration memory address and associated configuration data may be combined into a packet having a second memory address bit size (e.g., 64 bits) greater than the first memory address bit size (e.g., 32 bits). The packet may be used to establish compatibility for legacy operating systems that attempt to communicate with peripheral component interconnect (PCI) interface-based peripherals, and similar platform devices, that have been integrated into the same package as the processor.

20 Claims, 3 Drawing Sheets

OTHER PUBLICATIONS

Reason for Refusal Office Action from counterpart Japan Patent Application No. 2006-349809, mailed Jul. 8, 2010, 6 pages.

Decision of Refusal Office Action from counterpart Japan Patent Application No. 2006-349809, mailed Jan. 11, 2011, 6 pages.

* cited by examiner

ADDRESS SPACE EMULATION

TECHNICAL FIELD

Various embodiments described herein relate to data processing generally, including apparatus, systems, and methods used to communicate information to hardware devices via registers and other memory locations.

BACKGROUND INFORMATION

Older central processing units (CPUs) did not typically integrate platform components, such as memory controllers, into the same package as the processor itself. To communicate with such non-integrated components, the operating system (OS) might use a variety of schemes, including a register-based interface, such as the peripheral component interconnect (PCI) 2.0 interface. For more information on the PCI 2.0 interface, please refer to Revision 2.2 of the corresponding specification as published by the PCI-SIG (Special Interest Group) on Dec. 18, 1998, and later revisions.

To improve performance, some platform components, such as memory controllers, have been fabricated to reside in the same package as the processor core(s). To simplify such designs and increase performance still further, the registers of some integrated platform components have migrated from traditional 32 bit input/output (I/O) space into 64 bit memory-mapped address space. However, legacy (older) OS software used with such integrated platform components may still attempt to access the component registers using the older register-based mechanisms, such as the PCI interface.

DETAILED DESCRIPTION

Figure 1:
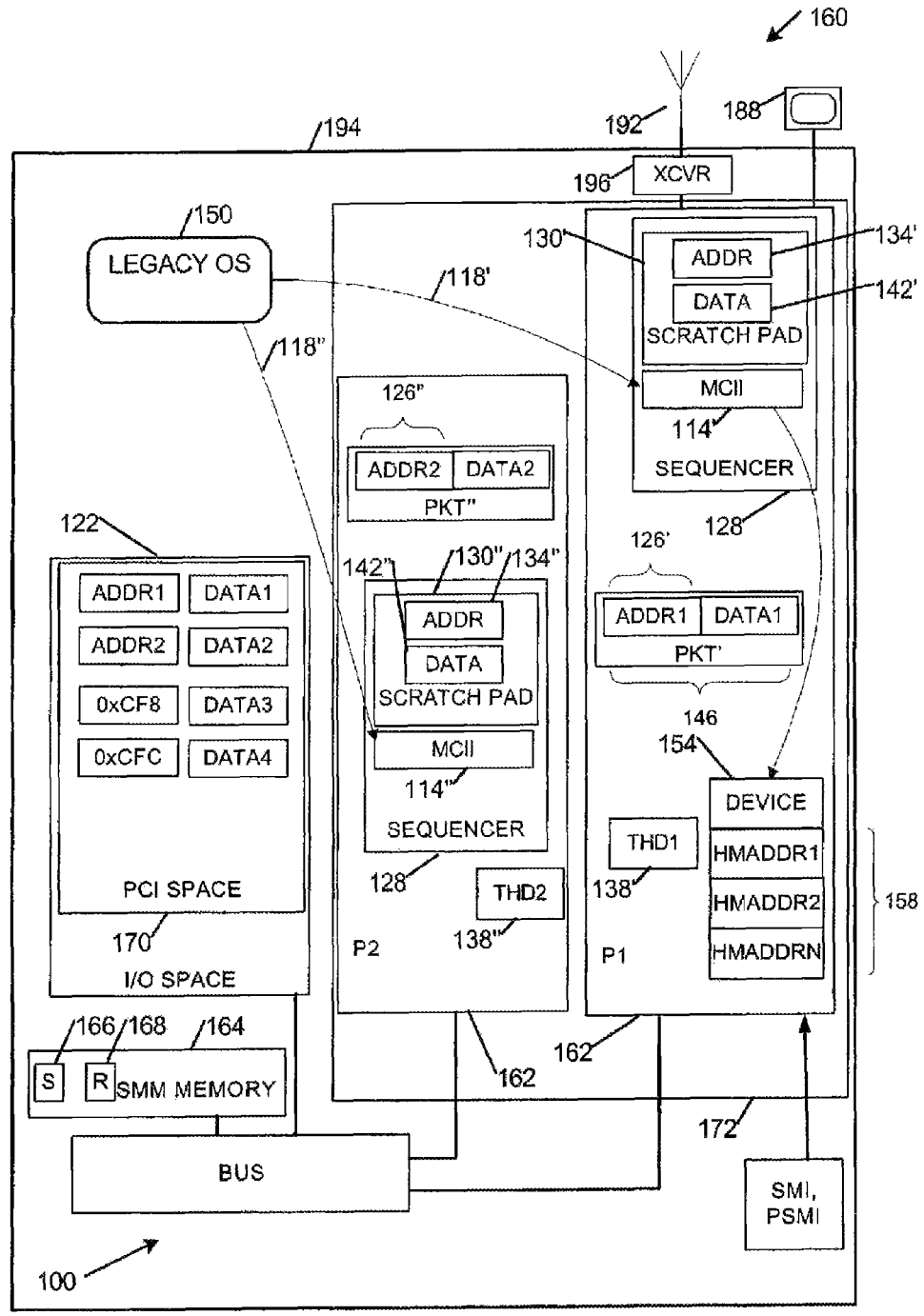
FIG. 1 is a block diagram of apparatus and systems according to various embodiments of the invention.

FIG. 1 is a block diagram of apparatus 100 and systems 160 according to various embodiments of the invention. To address the challenges described above, some embodiments may operate to emulate functional memory mapped register blocks, such as those used in the PCI I/O address space. In this manner, hardware compatibility between a legacy OS and integrated platform components, whether or not such components (e.g., memory controllers, cache controllers, etc.) are PCI-based, can be maintained.

Thus, in some embodiments, an address space emulation apparatus 100 may comprise one or more processors P1, P2. The processors P1, P1 may include, in turn, a macrocode instruction interceptor (MCII) 114 to detect I/O access operations 118', 118" associated with an I/O address space 122, such as a PCI I/O address space 170, and a first memory address bit size 126 (e.g., 16 bits or 32 bits, etc.), when such accesses are directed to integrated devices 154. The MCII 114 may form a portion of a micro-code sequencer 128. Such access operations 118', 118" may occur during an I/O address space 122 access operation, including a memory read or memory write to a PCI I/O address space 170. However, the access operations 118', 118" will not be detected unless they are directed to integrated devices 154 that are actually mapped to memory addresses HMADDR1, HMADDR2, . . . , HMADDRN, instead of addresses in the traditional I/O address space 122.

In some embodiments, a scratch pad memory 130', 130", such as a micro-code scratch pad memory, may operate to record a configuration memory address 134 associated with an operating system thread 138 and the I/O address space 122. The MCII 114 may operate to combine the configuration memory address 134 and associated configuration data 142 into a packet PKT having a second memory address bit size 146 greater than the first memory bit size 126. The packet PKT may then be used as a direct or indirect reference to a memory location (e.g., HMADDR), including a high memory location to access a device (e.g., an integrated platform device 154) in the processor package 162. For example, addresses in the region between 4 GB (less 16 MB) to 4 GB (less 32 MB) may be reserved for such operations in some embodiments. Thus, for example, address 0xFA00_0000 is a high memory address that can be internally used to write the combined PCI packet. Of course other address ranges may be used.

With respect to accessing PCI I/O space, whatever is written to 0xCF8 may be used to uniquely define the desired high memory address HMADDR1, HMADDR2, . . . , HMADDRN. The data written or read may be padded to fit a 64-bit word size, or any bit size 146 larger than the original bit size 126', 126". For example, the legacy OS 150 may operate to select the index of register to which a consequent data byte (or word) should be written by writing the combined address and register selection to the address 0xcf8 in a packed format, as determined by the PCI specification referenced previously. This address information can be extracted and combined with the data from the next I/O address access to form a packet, such that the data is then formatted properly to be written to a high memory address defined by the combined address and register selection.

To better understand how some embodiments of such an apparatus 100 might operate, consider the following example. A legacy OS 150 may operate under the assumption that integrated devices 154, such as peripherals, are accessed according to their respective locations in the traditional PCI 2.0 I/O address space 170. That is, the configuration memory address 134 and the associated configuration data 142 may be intended to access a PCI address configuration space 170. Thus, accesses to the registers 158 of integrated platform devices 154 might be made using 32 bit I/O memory access cycles to selected addresses in the PCI I/O space (e.g., a CONFIG_ADDRESS configuration memory address of 0xCF8, having bit 31 set). The MCII 114, perhaps implemented as part of a CPU I/O microcode module, may operate to save the data 142 associated with the access operation 118', 118" to a scratch pad memory 130', 130" location that is reserved by microcode for each (logical or physical) CPU thread 138'.

Since PCI access pairs may be executed as critical code sequences by a processing entity (e.g., processor P1 or P2), the same CPU thread 138' may also operate to issue an access to a second PCI 2.0 I/O address (e.g., CONFIG_DATA address of 0xCFC). The MCII 114 may then operate to combine the 32 bit configuration address 134 and the 32 bit configuration data 142 into a single 64 bit packet PKT. The 64 bit packet PKT, in turn, may be used as a reference (e.g., index) or address that corresponds directly, or indirectly, to a high memory address (e.g., address HMADDRN) specially decoded for communicating with integrated platform hardware devices, such as core hardware devices 154, including integrated PCI peripherals, that use the registers as memory-mapped registers. A memory read or memory write may then be made to the referenced location 158. In this manner, the access operation 118', 118" has been detected, and the I/O address space 122 has been emulated to assist the legacy OS 150 in communicating with integrated platform components, such as the core hardware devices 154.

In some embodiments, a single integrated circuit package 172 may house a processor P1 (or multiple processors P1, P2 as part of a multi-core processor package), and the scratch pad memory 130', 130". The MCII 114 may be housed in the package 172 as well, and may comprise hardware, software, firmware, or any combination of these, as desired. CPU microcode may be used in some embodiments to accomplish the emulation described, and in some cases, emulation may be accomplished entirely by using microcode instructions, without the need for additional hardware.

The processors P1, P2 may each include one or more core hardware devices 154, such as integrated memory controller core hardware elements, having one or more associated registers 158, such as memory-mapped registers. The configuration memory address 134 and/or the associated configuration data 142 may be used to modify the content (e.g., bits) of the registers 158 located at various high memory addresses HMADDR1, HMADDR2, . . . , HMADDRN.

As noted previously, the first memory address bit size 126 may comprise some fraction of the second memory address bit size 146. For example, in some embodiments, the first memory address bit size 126 may be about one-half or about one-fourth of the second memory address bit size 146. Thus, if the first memory address bit size 126 is 16 bits or 32 bits, then the second memory address bit size 146 might be 32 bits, 64 bits, or 128 bits, respectively. It should be noted that these sizes are merely examples, and not limiting. The first memory address bit size 126 and the second memory address bit size 146 may be any number of bits, as selected by the designer of the apparatus 100 and systems 160 described herein.

In some cases, the process of accessing the I/O address space 122 may be interrupted, perhaps by high-priority interrupts, including a system management interrupt (SMI). For example, in some circumstances an access to PCI configuration address 0xCF8 may not be followed by the expected data read/write operation from/to the configuration data address 0xCFC. If such an interrupt occurs (e.g., an SMI), control may be transferred to the platform system management mode (SMM) code. At this point, the MCII 114 may operate to save the scratch pad memory 130', 130" content for the interrupted thread (which is usually not accessible to the SMM routine). Thus, in some embodiments, the SMM routine may conduct a 32 bit read to address 0xCF8 and save the resulting data into a reserved SMM data area 168, such as an SMM memory 164 reserved data area 168. It should be noted that in some systems, the SMIs of all processors P1, P2 are interconnected so that a single SMI may result in all processors P1, P2 operating to save the scratch pad memory 130', 130" content in the SMM memory 164 on a per-thread basis.

What if additional peripheral I/O space 122 accesses are to be performed during the service of an SMI? In this case, the SMM code may operate to read the content of the 0xCF8 I/O address and save the content in an SMI data area 166 within the SMM memory 164. Now the SMM code is free to access the peripheral I/O address space 122 at will. However, prior to returning to the previous operating mode, the SMM code may operate to re-write the previously-saved content of the 0xCF8 I/O address to the 0xCF8 register(s) and will make an I/O access to 0XCF8 with the saved data. This access operation will again be detected by the MCII 114, which will wait for the next 0xCFC memory access to complete emulation in the manner described. Thus, in some embodiments, the SMM code may save the 0xCF8 indices located in the scratch pad memory 130', 130" to its own SMI data area (e.g., area 166), and then execute additional 0xCF8 and 0xCFC accesses during execution of the SMI service routine, if needed.

It should be noted that the scratch pad memory 130', 130" (perhaps included in the processors P1, P2) is not the same as the SMM memory 164. For example, while the scratch pad memory 130', 130" may comprise a micro-code scratch pad memory, the SMM memory 164 may be selected to comprise a reserved memory, such that the macro-code flags are located in dynamic random access memory (DRAM). Thus, the SMM code servicing an additional SMI call (e.g., an SMI that occurs after the SMM has been entered) would not operate to save the scratch pad memory 130', 130" context from inside the package 172. Rather, the SMM code servicing an SMI might operate to read the 0xCF8 I/O address using an I/O instruction and then save the associated data in the SMM memory 164, perhaps in a separately allocated SMI data area 166.

Upon detecting the imminent execution of a resume (e.g., RSM) instruction, the MCII 114 of each processor P1, P2 may operate to restore the thread-specific 0xCF8 index values into separate scratch pad memories 130', 130" from the SMM memory 164. After the resume instruction is executed, any peripheral I/O space 122 accesses (e.g., accesses to a 0xCF8 address) that were interrupted may be completed by each thread 138 with a subsequent access to 0xCFC by the affected threads 138.

Other embodiments may be realized. For example, a system 160 according to various embodiments may include one or more processors P1, P2 coupled to each other as part of a multi-core package 172, or as a collection of packages 162. Many variations are possible. For example a first processor P1 may include a first MCII 114' to detect first I/O access operations 118' associated with an I/O address space 122 and a first memory address bit size 126. A second processor P2 may include a second MCII 114" to detect second I/O access operations 118" associated with the I/O address space 122 and the first memory address bit size 126. The processors P1, P2 may be physical processors or logical processors.

A first scratch pad memory 130' included in the first processor P1 may operate to record a configuration address 134' associated with a first OS thread 138' and the I/O address space 122, and the first MCII 114' may operate to combine the configuration memory address 134 associated with the first OS thread 138' and associated configuration data 142' into a first packet PKT' having a second memory address bit size 146 greater than the first memory bit size 126, as described above. A second scratch pad memory 130", such as a micro-code scratch pad memory, may operate to record a configuration address 134" associated with a second OS thread 138" and the I/O address space 122. The second MCII 114" may operate to combine the configuration memory address 134" associated with the second OS thread 138" and associated configuration data 142" into a second packet PKT" having the second memory address bit size 146. The scratch pad memories 130', 130" may be accessed by a micro-code sequencer 128.

The system 160 may include one or more displays 188, including cathode ray tube displays, flat panel displays, and others, to display data (e.g., the configuration data 142) processed by the processors P1, P2. The display(s) 188 may be electrically coupled to the processor(s) P1, P2, either directly, or via a bus and/or graphics controller peripheral (not shown). A computer motherboard 194 may operate to supply operational power to the processors P1, P2. The system 160 may also include one or more wireless transceivers 196 to transmit data processed by the processors P1, P2, as well as one or more antennas 192, including onmidirectional, dipole, patch, or beam antennas, coupled to the wireless transceiver. In some embodiments, the system 160 may include a system management memory 164 to receive copies of associated configuration data 142 after a high level interrupt, including an SMI, is detected by the processors P1, P2.

Any of the components previously described can be implemented in a number of ways, including simulation via software. Thus, the apparatus 100; processors P1, P1; MCIIs 114', 114"; I/O access operations 118', 118"; I/O address space 122; first and second memory address bit sizes 126, 146; micro-code sequencer 128; scratch pad memories 130', 130"; configuration memory address 134; OS threads 138', 138"; associated configuration data 142', 142"; OS 150; integrated devices 154; registers 158; systems 160; packages 162, 172; SMM memory 164; SMI data area 166; reserved SMM memory area 168; I/O address space 170; displays 188; antennas 192; motherboard 194; wireless transceivers 196; memory addresses HMADDR1, HMADR2, . . . , HMADDRN; packets PKT', PKT"; and interrupts SMI may all be characterized as "modules" herein.

These modules may include hardware circuitry, single or multi-processor circuits, memory circuits, software program modules and objects, firmware, and combinations thereof, as desired by the architect of the apparatus 100 and systems 160, and as appropriate for particular implementations of various embodiments. The modules may be included in a system operation simulation package such as a software electrical signal simulation package, a power usage and distribution simulation package, a network security simulation package, a power/heat dissipation simulation package, a signal transmission-reception simulation package, or any combination of software and hardware used to simulate the operation of various potential embodiments. Such simulations may be used to characterize or test the embodiments, for example.

It should also be understood that the apparatus and systems of various embodiments can be used in applications other than desktop or laptop computers having single or multi-core processors. Thus, various embodiments of the invention are not to be so limited. The illustrations of apparatus 100 and systems 160 are intended to provide a general understanding of the structure of various embodiments, and they are not intended to serve as a complete description of all the elements and features of apparatus and systems that might make use of the structures described herein.

Applications that may include the novel apparatus and systems of various embodiments include electronic circuitry used in high-speed computers, communication and signal processing circuitry, modems, single or multi-processor modules, single or multiple embedded processors, and application-specific modules, including multilayer, multi-chip modules. Such apparatus and systems may further be included as sub-components within a variety of electronic systems, such as data bridges, switches, and hubs; televisions and cellular telephones; personal computers and workstations; radios and video players; and vehicles, among others.

Figure 2:
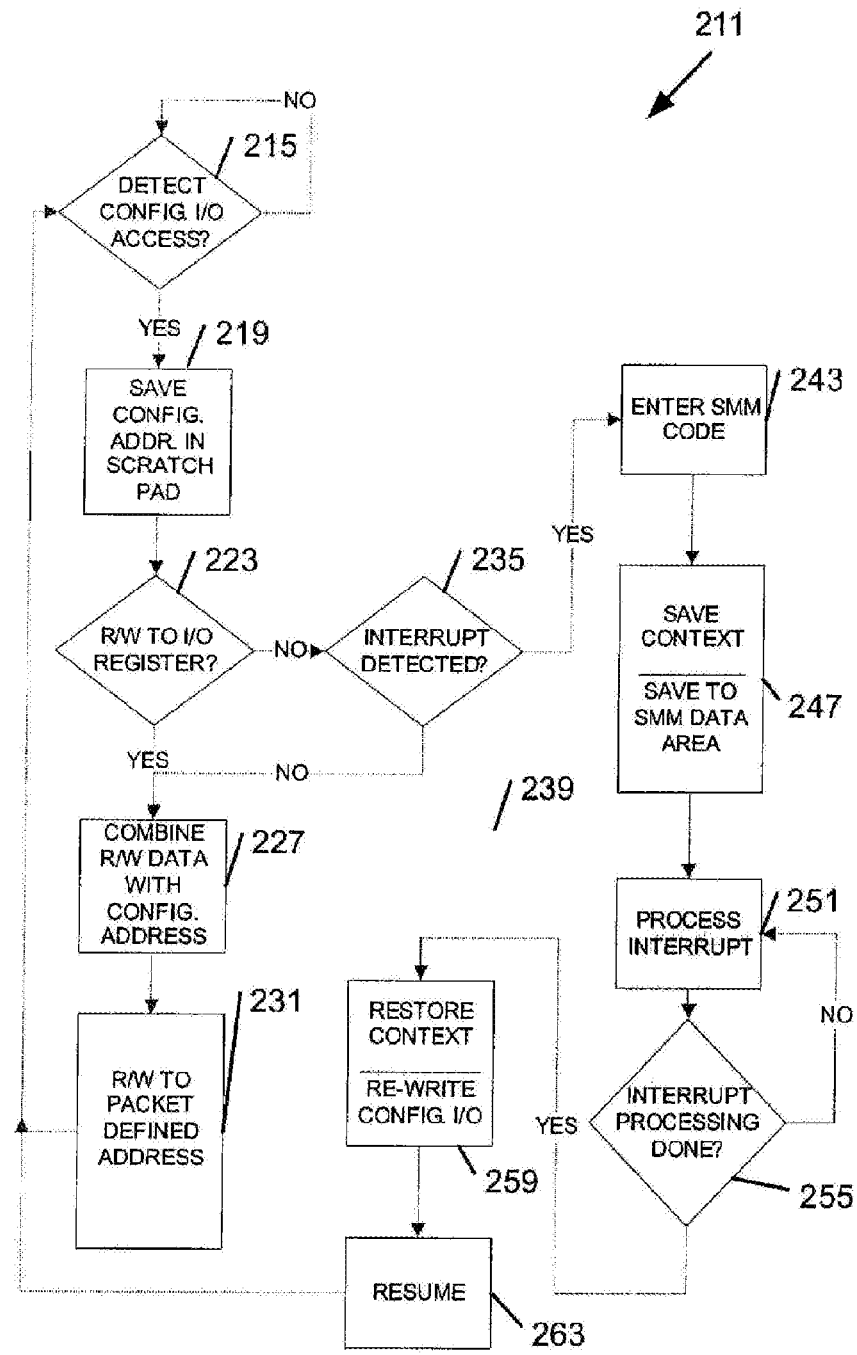
FIG. 2 is a flow diagram illustrating several methods according to various embodiments of the invention.

Some embodiments may include a number of methods. For example, FIG. 2 includes flow diagrams illustrating several methods 211 according to various embodiments of the invention. An address space emulation method 211 may be executed in response to peripheral I/O address space accesses, and at other selected times, such as prior to the execution of any thread. In some embodiments, the method 211 may be executed by each processor in a multi-core package, and/or by each operational thread in each processor core in the package.

The method 211 may begin at block 215 with detecting an I/O access operation to an integrated device, perhaps associated with a selected configuration memory address and a first memory address bit size (e.g., 0xCF8 and 32 bits). A sequence of micro-code may be executed to accomplish detecting the I/O access operation.

In some embodiments, the method 211 may include saving the configuration memory address in a scratch pad memory, such as a micro-code scratch pad memory, at block 219. This activity may include saving the configuration memory address on a per-thread basis.

If a subsequent memory read or memory write to I/O address space is detected at block 223, then the method 211 may go on to include combining the configuration memory address and associated configuration data into a packet at block 227. The packet may have a second memory address bit size greater than the first memory address bit size, as noted previously.

The method 211 may go on at block 231 to include executing one of a read operation or a write operation to an address defined by the content of the packet. The address defined by the content of the packet may comprise a memory address decoded to communicate with a memory-mapped register in a core hardware element (e.g., a platform hardware component that has been integrated into the same package as the processor, such as a PCI-compatible peripheral integrated into the same package as the processor currently executing the read/write operations). Thus, the method 211 may include writing to a memory address decoded to communicate with a memory-mapped register in a core hardware element using the configuration memory address (to define the memory-mapped register) and the associated configuration data at block 231. If no read/write operation is detected at block 223, and no high-level interrupt, such as an SMI is detected at block 235, then the method 211 may include continuing with the activities described with respect to block 227.

In some embodiments, if a high level interrupt, such as an SMI is detected at block 235, then the method 211 may include entering or executing SMM code at block 243, and saving the context, such as a micro-code context, associated with the configuration memory address and the associated configuration data at block 247. This may include reading the 0xCF8 configuration address and directly saving a copy of the information read into an SMM reserved memory. In some embodiments, this may include saving the content of one or more (e.g., multiple) micro-code scratch pad memories including data associated with the configuration memory address in a system management memory, such as an SMM reserved memory.

The method 211 may include processing the interrupt, such as an SMI at block 251. The interrupt processing routine may access the I/O address space, perhaps using an SMM interrupt data area, and in some embodiments such accesses will not be detected by the MCII (e.g., 0xCF8 and 0xCFC registers can be used outside of the PCI 2.0 access construct). When the interrupt processing is completed at block 255, the method 211 may include restoring the context, such as a micro-code context, at block 259. This activity may include retrieving the copy of the associated configuration data from the system management memory (e.g., SMM reserved memory area), re-writing the associated configuration data to the configuration address, and executing a resume instruction so operation can be returned to the interrupted context. In some embodiments, this activity may be directed entirely by the execution of SMM code.

The methods described herein do not have to be executed in the order described, or in any particular order. Moreover, various activities described with respect to the methods identified herein can be executed in repetitive, serial, or parallel fashion. Information, including parameters, commands, operands, and other data, can be sent and received in the form of one or more carrier waves.

One of ordinary skill in the art will understand the manner in which a software program can be launched from a computer-readable medium in a computer-based system to execute the functions defined in the software program. Various programming languages may be employed to create one or more software programs designed to implement and perform the methods disclosed herein. The programs may be structured in an object-orientated format using an object-oriented language such as Java or C++. Alternatively, the programs can be structured in a procedure-orientated format using a procedural language, such as assembly or C. The software components may communicate using a number of mechanisms well known to those skilled in the art, such as application program interfaces or interprocess communication techniques, including remote procedure calls. The teachings of various embodiments are not limited to any particular programming language or environment.

Figure 3:
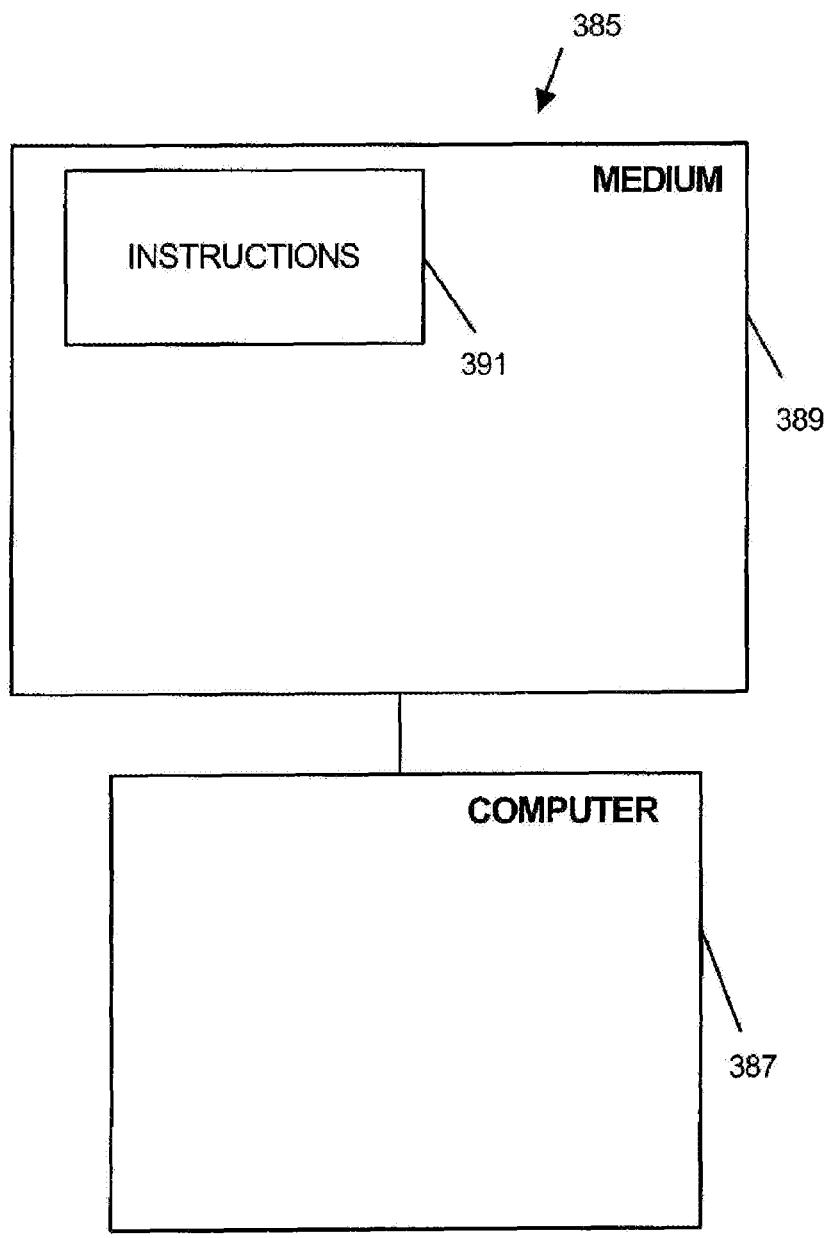
FIG. 3 is a block diagram of an article according to various embodiments of the invention.

Thus, other embodiments may be realized. For example, FIG. 3 is a block diagram of an article 385 according to various embodiments, such as a computer, a memory system, a magnetic or optical disk, some other storage device, and/or any type of electronic device or system. The article 385 may include a computer 387 (having one or more processors) coupled to a computer-readable medium 389, such as a memory (e.g., fixed and removable storage media, including tangible memory having electrical, optical, or electromagnetic conductors) or a carrier wave, having associated information 391 (e.g., computer program instructions and/or data), which when executed by the computer 387, causes the computer 387 to perform a method including detecting an I/O access operation associated with a configuration memory address and a first memory address bit size, and combining the configuration memory address and associated configuration data into a packet having a second memory address bit size greater than the first memory address bit size.

Other activities may include executing one of a read operation or a write operation to an address defined by content of the packet (e.g., the address defined by the content of the packet may comprise a memory address decoded to communicate with a memory-mapped register in a core hardware element). Further activities may include executing a sequence of micro-code to accomplish detecting the I/O access operation.

In some embodiments, additional activities may include detecting a system management interrupt, and saving content of multiple micro-code scratch pad memories including data associated with the configuration memory address in a system management memory. Other activities may include any of those forming a portion of the methods illustrated in FIG. 2 and described above.

Implementing the apparatus, systems, and methods disclosed herein may operate to permit accessing integrated platform level resources, such as memory controllers included in a CPU package, as 64 bit-wide memory mapped registers. In addition, legacy OS software compatibility with traditional PCI 2.0 space used by other hardware (e.g., hardware addressed using 0xCF8 and 0xCFC addresses, for example) may be achieved. Thus, efficiency and performance may be enhanced, while compatibility is maintained.

The accompanying drawings that form a part hereof show, by way of illustration and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein individually or collectively by the term "invention" merely for convenience and without intending to voluntarily limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted to require more features than are expressly recited in each claim. Rather, inventive subject matter may be found in less than all features of a single disclosed embodiment. Thus the following claims are hereby incorporated into the Detailed Description, with each claim standing on its own as a separate embodiment.

What is claimed is:

1. A processor, comprising:
  a micro-code sequencer;
  a macro-code instruction interceptor to
    detect an input/output access operation associated with an input/output address space and a first configuration memory address of a first bit size, wherein such a detection indicates that an input/output access to a memory-mapped register in a core hardware element is to be executed,
    then responsively combine the first configuration memory address and configuration data associated with the input/output access operation to generate a data packet, wherein the first configuration memory address and the configuration data are included in a peripheral component interconnect (PCI) configuration space and the configuration memory address is at 0xCF8; and
  an integrated device to be accessed at a second memory address indicated contents of the data packet wherein the second memory address is of a second bit size that is larger than the first bit size and indicates the memory-mapped register, wherein the macro-code instruction interceptor forms a portion of the micro-code sequencer, and wherein the micro-code sequencer is to access a scratch pad memory that records the first configuration memory address.

2. The processor of claim 1, wherein the first bit size is one of about one-half or about one-fourth of the second bit size.

3. The processor of claim 1, further comprising:
a scratch pad memory.

4. A system, comprising:
a first processor including a micro-code sequencer, a macro-code instruction interceptor, and an integrated device, wherein the macro-code instruction interceptor forms a portion of the micro-code sequencer to detect an input/output access operation associated with an input/output address space and a first configuration memory address of a first bit size, wherein such a detection indicates that an input/output access to a memory-mapped register in a core hardware element is to be executed, then responsively combine the first configuration memory address and configuration data associated with the input/output access operation to generate a data packet, and wherein the integrated device is to be accessed at a second memory address indicated by contents of the data packet wherein the second memory address is of a second bit size that is larger than the first bit size and indicates the memory-mapped register, wherein the macro-code instruction interceptor forms a portion of the micro-code sequencer, wherein the micro-code sequencer is to access a scratchpad memory that recodes the first configuration memory address, and wherein the first configuration memory address and the configuration data are included in a peripheral component interconnect (PCI) configuration space and the configuration memory address is at 0xCF8; and
a flat panel display electrically coupled to the first processor.

5. The system of claim 4, further comprising:
a computer motherboard to supply operational power to the first processor.

6. The system of claim 4, further comprising:
a wireless transceiver to transmit data processed by the first processor.

7. The system of claim 4, further comprising:
a second processor including a second macro-code instruction interceptor to detect second input/output access operations associated with the input/output address space and a second configuration memory address of the first bit size, and to responsively combine the second configuration memory address and configuration data associated with the second input/output access operation to generate a second data packet, and wherein the second processor is to access a second integrated device at a third memory address of the second bit size indicted by the contents of the second data packet; and
an integrated circuit package to house the first processor and the second processor.

8. The system of claim 4, further comprising:
a system management memory to receive a copy of the configuration data after a system management interrupt is detected by the first processor.

9. The system of claim 4, further comprising:
a scratch pad memory.

10. A method, comprising:
detecting an input/output access operation associated with an input/output address space and a first configuration memory address of a first bit size by using a macro-code instruction interceptor, wherein the macro-code instruction interceptor forms a portion of a micro-code sequencer and wherein such a detection indicates that an input/output access to a memory-mapped register in a core hardware element is to be executed,
then responsively combining the first configuration memory address and configuration data associated with the input/output access operation to generate a data packet, wherein the first configuration memory address and the configuration data are included in a peripheral component interconnect (PCI) configuration space and the configuration memory address is at 0xCF8; and
accessing an integrated device at a second memory address indicated by contents of the data packet wherein the second memory address having a second bit size greater than the first bit size and indicates the memory-mapped register, wherein the micro-code sequencer is to access a scratch pad memory that recodes the first configuration memory address.

11. The method of claim 10, further comprising:
saving the first configuration memory address in a micro-code scratch pad memory.

12. The method of claim 10, further comprising:
saving the first configuration memory address on a per-thread basis.

13. The method of claim 10, wherein the memory-mapped register is decoded as part of the peripheral component interconnect (PCI) configuration space.

14. The method of claim 10, further comprising:
saving a micro-code context associated with the first configuration memory address and the configuration data;
processing a system management interrupt; and
restoring the micro-code context.

15. The method of claim 10, further comprising:
detecting a system management interrupt; and
saving a copy of the configuration data in a system management memory.

16. The method of claim 15, further comprising:
retrieving the copy of the configuration data;
writing the configuration data to the first configuration memory address; and
executing a resume instruction.

17. A non-transitory computer-readable storage medium having instructions stored thereon which, when executed by a processor, cause the processor to perform a method comprising:
detecting an input/output access operation associated with an input/output address space and a first configuration memory address of a first bit size by using a macro-code instruction interceptor, wherein the macro-code instruction interceptor forms a portion of a micro-code sequencer and wherein such a detection indicates that an input/output access to a memory-mapped register in a core hardware element is to be executed,
then responsively combining the first configuration memory address and configuration data associated with the input/output access operation to generate a data packet, wherein the first configuration memory address and the configuration data are included in a peripheral component interconnect (PCI) configuration space and the configuration memory address is at 0xCF8; and
accessing an integrated device at a second memory address indicated contents of the data packet wherein the second memory address having a second bit size greater than the first bit size and indicates the memory-mapped register, wherein the micro-code sequencer is to access a scratch pad memory that recodes the first configuration memory address.

18. The computer-readable storage medium of claim 17, wherein the instructions, when executed by the processor, cause the processor to perform a method comprising:
executing one of a read operation or a write operation to the second memory address.

19. The computer-readable storage medium of claim 17, wherein the instructions, when executed by the processor, cause the processor to perform a method comprising:
   executing a sequence of micro-code to accomplish the detecting.

20. The computer-readable storage medium of claim 17, wherein the instructions, when executed by the processor, cause the processor to perform a method comprising:
   detecting a system management interrupt; and
   saving content of multiple micro-code scratch pad memories including data associated with the first configuration memory address in a system management memory.

* * * * *